US006899210B2

(12) United States Patent
Tomiyama

(10) Patent No.: US 6,899,210 B2
(45) Date of Patent: May 31, 2005

(54) PISTON COUPLING MECHANISM AND LOCKUP DEVICE FOR FLUID-TYPE TORQUE TRANSMISSION DEVICE EQUIPPED WITH THE SAME

(75) Inventor: Naoki Tomiyama, Osaka (JP)

(73) Assignee: Exedy Corporation, Osaka (JP)

( * ) Notice: Subject to any disclaimer, the term of this patent is extended or adjusted under 35 U.S.C. 154(b) by 27 days.

(21) Appl. No.: 10/375,155

(22) Filed: Feb. 28, 2003

(65) Prior Publication Data

US 2003/0173175 A1 Sep. 18, 2003

(30) Foreign Application Priority Data

Mar. 15, 2002 (JP) ........................................ 2002-073006

(51) Int. Cl.$^7$ ............................................. F16H 45/02
(52) U.S. Cl. ................... 192/3.29; 192/70.28
(58) Field of Search .......................... 192/3.29, 85 AA, 192/109 R, 70.28; 92/130 B, 132

(56) References Cited

U.S. PATENT DOCUMENTS

| | | | | |
|---|---|---|---|---|
| 4,986,398 A | * | 1/1991 | Olsen ........................ | 192/3.28 |
| 5,209,330 A | * | 5/1993 | Macdonald ................ | 192/3.29 |
| 5,377,796 A | * | 1/1995 | Friedmann et al. ........ | 192/3.29 |
| 5,826,690 A | * | 10/1998 | Maingaud et al. ......... | 192/3.29 |
| 6,079,530 A | * | 6/2000 | Arhab ....................... | 192/3.29 |
| 6,293,380 B1 | * | 9/2001 | Arhab ....................... | 192/3.29 |
| 6,378,676 B1 | * | 4/2002 | Chasseguet et al. ....... | 192/3.29 |
| 6,390,263 B1 | * | 5/2002 | Arhab ....................... | 192/3.29 |
| 6,640,945 B2 | * | 11/2003 | Arhab et al. ............... | 192/3.29 |
| 6,725,988 B2 | * | 4/2004 | Bauer et al. ............... | 192/3.29 |
| 6,736,247 B2 | * | 5/2004 | Arhab et al. ............... | 192/3.29 |
| 2001/0008198 A1 | * | 7/2001 | Maienschein et al. ..... | 192/3.29 |

FOREIGN PATENT DOCUMENTS

| | | |
|---|---|---|
| JP | 10-47453 A | 2/1998 |
| JP | 11-509611 A | 8/1999 |

* cited by examiner

*Primary Examiner*—Richard M. Lorence
(74) *Attorney, Agent, or Firm*—Shinjyu Global IP Counselors, LLP

(57) ABSTRACT

A piston coupling mechanism in a lockup device having a piston that presses the friction coupling part of a clutch mechanism against the front cover of a fluid-type torque transmission device is provided reduce the amount of work required for assembly. The piston coupling mechanism 76 of the lockup device 7 functions to couple the piston 75 to the front cover 11 such that it rotate integrally with the front cover 11 while being movable in the axial direction. The piston coupling mechanism 76 has a piston lug plate 83, a cover lug plate 84, and a return plate 85. The piston lug plate 83 and the cover lug plate 84 mate in such a manner that they can move in the axial direction but cannot rotate relative to each other. The return plate 85 can apply an axial force against the piston 75 directed toward the transmission and can also limit the axial movement of the piston 75 toward the transmission.

25 Claims, 7 Drawing Sheets

PISTON COUPLING MECHANISM AND LOCKUP DEVICE FOR FLUID-TYPE TORQUE TRANSMISSION DEVICE EQUIPPED WITH THE SAME

BACKGROUND OF THE INVENTION

1. Field of the Invention

The present invention relates to a piston coupling mechanism. More specifically, the present invention relates to a piston coupling mechanism provided in a lockup device that functions to lock up a fluid-type torque transmission device by using a piston to press the friction coupling part of a clutch mechanism against the front cover of the fluid-type torque transmission device. The piston coupling mechanism serves to couple the piston and the front cover together in such a manner that they can move in the axial direction but cannot rotate relative to each other. The present invention also relates to a lockup device for a fluid-type torque transmission device. More specifically, the present invention relates to a lockup device provided in a fluid-type torque transmission device equipped with a front cover having a friction surface, an impeller that is fixed to the front cover and forms a fluid chamber, and a turbine arranged opposite the impeller inside the fluid chamber.

2. Background Information

A conventional torque converter has three types of internal bladed wheels (an impeller, a turbine, and a stator). A torque converter represents one type of fluid-type torque transmission device because it transmits torque through fluid enclosed therein. A torque converter is often provided with a lockup device. The lockup device is typically disposed in the space between the turbine and a front cover, which form the fluid chamber of the torque converter. The lockup device is a mechanism that serves to couple mechanically the front cover and the turbine together such that torque can be transmitted directly from the front cover to the turbine.

A conventional lockup device has a circular disc-shaped piston, a drive plate, a driven plate, and torsion spring. The circular disc-shaped piston can be pressed against the front cover. The drive plate is fixed to an outer circumferential part of the piston. The driven plate is fixed to the turbine. The torsion spring serves to couple the drive plate and the driven plate together elastically in the rotational direction. When the lockup device is engaged, torque is transmitted from the front cover to the piston, and from the piston to the turbine through the torsion spring. The torsion spring is compressed in the rotational direction of the torque converter between the drive plate and the driven plate and absorbs and damps torsional vibrations.

There have already been proposals for such a lockup device that has a plurality of friction surfaces to increase the torque transmission capacity. One such device has an elastic coupling mechanism, a clutch mechanism, and a piston. The elastic coupling mechanism is joined together with the turbine. The clutch mechanism has a friction coupling part and rotates integrally with the elastic coupling mechanism. The piston presses the friction coupling part against the front cover.

This kind of device requires torque to be transmitted directly from the front cover to the piston during lockup and several different mechanisms have been proposed for this purpose. For example, in the lockup devices described in Official Gazette No. 11-509611 (Japanese translation of PCT publication) and Laid-Open Japanese Patent Publication No. 10-47453, the piston is mounted to the front cover using a plurality of flat springs. More specifically, a plate member is mounted to the front cover and one end of each flat spring is fixed to the plate member with a rivet(s), a bolt(s), or the like. The other end of each flat spring is fixed to the piston with a rivet(s). Thus, the piston can move axially with respect to the front cover and rotate integrally with the front cover.

In these conventional technologies, a plurality of flat springs is used to couple the piston and front cover together such that they cannot rotate relative to each other and rivets, bolts, or the like are required to fix both ends of the flat springs. Consequently, the number of parts is large, the structure is complex, and the weight is great. Furthermore, the amount of assembly work is large.

In view of the above, it will be apparent to those skilled in the art from this disclosure that there exists a need for an improved piston coupling mechanism and lockup device for fluid-type torque transmission device equipped with the same. This invention addresses that need in the art as well as other needs, which will become apparent to those skilled in the art from this disclosure.

SUMMARY OF THE INVENTION

An object of the present invention is to reduce the amount of work required to assemble a piston coupling mechanism in a lockup device having a piston that presses the friction coupling part of a clutch mechanism against the front cover.

A piston coupling mechanism in accordance with a first aspect of the present invention is provided in a lockup device that functions to lock up a fluid-type torque transmission device by using a piston to press the friction coupling part of a clutch mechanism against the front cover of the fluid-type torque transmission device. The piston coupling mechanism serves to couple the piston and the front cover together in such a manner that they can move in the axial direction but cannot rotate relative to each other. The piston coupling mechanism is equipped with a first member, a second member, and a third member. The first member is fixed to the front cover. The second member is fixed to the piston and mates with the first member in such a manner that it cannot rotate relative to the first member but can move axially with respect to the first member. The third member has a fixed part, a hook part, and an elastic part. The fixed part is fixed to either the first member or the second member. The hook part mates with either the second member or the first member (whichever does not have the fixed part fixed thereto) from an axial direction while deforming elastically and limits the distance that the piston can move away from the front cover in the axial direction. The elastic part deforms elastically in the axial direction when the clutch is engaged, i.e., when the piston has approached the front cover in the axial direction.

With this piston coupling mechanism, the first member, which is fixed to the front cover, and the second member, which is fixed to the piston, are joined together such that they cannot rotate relative to each other. Consequently, the front cover and the piston cannot rotate relative to each other and torque can be transmitted. The fixed part of the third member is fixed to either the first member or the second member. The elastic part of the third member applies a force against the piston in the direction of separation from the front cover when the piston approaches the front cover in the axial direction. The hook part of the third member limits the distance to which the piston can move in the axial direction when the piston moves away from the front cover in the axial direction.

This piston coupling mechanism can be assembled by utilizing the fact that the first member or the second member mates with the other in such a manner that it can move in the axial direction and the fact that the hook part of the third member mates with the second or first member (i.e., whichever does not have the fixed part of the third member fixed thereto) while deforming elastically. As a result, man-hours required for assembly can be reduced in comparison with the man-hours required for assembling conventional piston coupling mechanisms.

A piston coupling mechanism in accordance with a second aspect of the present invention is the mechanism of the first aspect, wherein the third member is an annular member on which a plurality of hook parts and a plurality of elastic parts are formed.

This piston coupling mechanism allows the number of parts to be reduced because the third member is an annular member having hook parts and elastic parts.

A piston coupling mechanism in accordance with a third aspect of the present invention is the mechanism of the first or second aspect, wherein a mating part(s) that mates with the hook part(s) is formed on whichever of the first member and second member does not have the fixed part fixed thereto.

A piston coupling mechanism in accordance with a fourth aspect of the present invention is the mechanism of the third aspect, wherein a portion of whichever of the first member and second member has the fixed part fixed thereto mates with the mating part in such a manner that it cannot rotate relative to the mating part but can move axially with respect to the mating part.

In this piston coupling mechanism, the hook part and a portion of whichever of the first member and second member has the fixed part fixed thereto both mate with the mating part. Consequently, the shape of whichever of the first member and second member does not have the fixed part fixed thereto can be simplified.

A piston coupling mechanism in accordance with a fifth aspect of the present invention is the mechanism of any of the first to fourth aspects, wherein the hook part(s) extends axially from the fixed part and the elastic part(s) extends radially from the fixed part.

A sixth aspect of the present invention provides a lockup device that is provided in a fluid-type torque transmission device equipped with a front cover having a friction surface, an impeller that is fixed to the front cover and forms a fluid chamber, and a turbine arranged opposite the impeller inside the fluid chamber. The lockup device is equipped with a clutch mechanism, an elastic coupling mechanism, a piston, and a piston coupling mechanism. The clutch mechanism has a friction coupling part that can be pressed against the friction surface of the front cover. The elastic coupling mechanism elastically couples the clutch mechanism and the turbine together in the rotational direction. The piston is arranged between the front cover and the turbine and serves to press the friction coupling part against the friction surface. The piston coupling mechanism is structured in accordance with any one of the first to fifth aspects.

With this lockup device, the piston coupling mechanism can be assembled by moving the third member (which is fixed to either the first member or the second member) in the axial direction such that it mates with whichever of the first and second member does not have the fixed part fixed thereto. As a result, the amount of work required for assembling entire lockup device can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
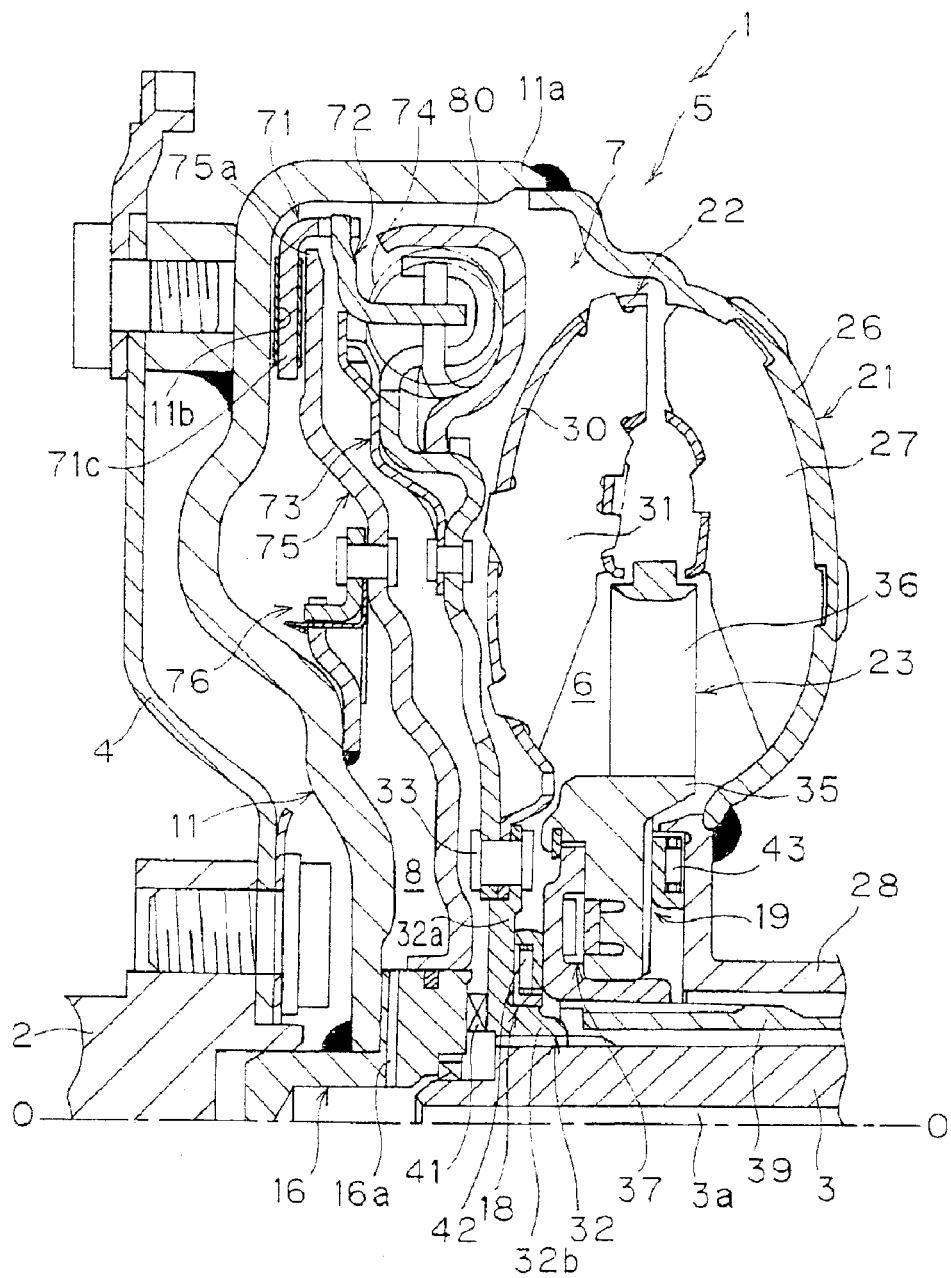
FIG. 1 is a vertical cross-sectional schematic view a torque converter equipped with a lockup device that utilizes a piston coupling mechanism in accordance with a preferred embodiment of the present invention.

Referring initially to FIG. 1, a torque converter 1 is illustrated in accordance with a first preferred embodiment of the present invention.

(1) Basic Structure of Torque Converter

FIG. 1 shows a vertical cross-sectional schematic view of the torque converter 1 in accordance with a first preferred embodiment of the present invention. The torque converter 1 serves to transmit torque from a crankshaft 2 of an engine to an input shaft 3 of a transmission. The engine, which is not shown in the Figures, is arranged on the left side of FIG. 1, and the transmission, which is also not shown, is arranged on the right side of FIG. 1. The line O—O shown in FIG. 1 is the rotational axis of the torque converter 1.

The torque converter 1 chiefly has a flexible plate 4 and a torque converter main body 5. The flexible plate 4 is made of a relatively thin, circular disc-shaped member, and serves both to transmit torque and to absorb bending vibrations transmitted to the torque converter main body 5 from the crankshaft 2. Therefore, the flexible plate 4 is provided with sufficient rigidity in the rotational direction for transmitting torque but its rigidity is low in the bending or axial direction.

The torque converter main body 5 is equipped with a front cover 11 to which an outer circumferential part of the flexible plate 4 is fixed, three types of bladed wheels (the impeller 21, the turbine 22, and the stator 23), and a lockup device 7. A fluid chamber defined by the front cover 11 and the impeller 21 is filled with fluid and divided into a fluid operating chamber 6 and an annular space 8. The fluid operating chamber 6 is torus shaped and defined by the impeller 21, the turbine 22, and the stator 23. The lockup device 7 is disposed in the annular space 8.

The front cover 11 is a circular disc-shaped body having a roughly cylindrical center boss 16 that extends in the axial direction fixed to an inside circumferential part thereof by welding or the like. The center boss 16 is inserted into a center hole of the crankshaft 2.

An outer cylindrical part 11a that extends toward the transmission is formed on an outer circumferential part of the front cover 11. An outer circumferential rim of an impeller shell 26 of the impeller 21 is fixed to the tip of the outer cylindrical part 11a by welding or the like. The front cover 11 and the impeller 21 form a fluid chamber the inside of which is filled with fluid. The impeller 21 chiefly has the impeller shell 26, a plurality of impeller blades 27 and an impeller hub 28. The impeller blades 27 are fixed to the inside of the impeller shell 26. The impeller hub 28 is fixed by welding or the like to an inner circumferential part of the impeller shell 26.

The turbine 22 is arranged inside the fluid chamber so as to face the impeller 21 in the axial direction. The turbine 22 chiefly has a turbine shell 30, a plurality of turbine blades 31 and a turbine hub 32. The plurality of turbine blades 31 is fixed to the surface of the turbine shell 30 that faces the impeller 21. The turbine hub 32 is fixed to the inner circumferential rim of the turbine shell 30. The turbine hub 32 has a flange part 32a and a boss part 32b. The turbine shell 30 and the turbine hub 32, as well as a driven plate 73 (discussed later), are fixed together with a plurality of rivets 33 at the flange part 32a of the turbine hub 32. Splines that mate with the input shaft 3 are formed on the internal surface of the boss part 32b of the turbine hub 32. Thus the turbine hub 32 is made to rotate integrally with the input shaft 3.

The stator 23 is installed axially between an inner circumferential part of the impeller 21 and an inner circumferential part of the turbine 22 and serves to redirect the flow of the fluid returning to the impeller 21 from the turbine 22. The stator 23 is preferably made of resin or aluminum alloy that has been cast as a single unit. The stator 23 chiefly has a ring-shaped stator carrier 35 and a plurality of stator blades 36 provided on the outer circumferential surface of the stator carrier 35. The stator carrier 35 is supported by a cylindrical stationary shaft 39 with a one-way clutch 37 disposed therebetween. The stationary shaft 39 extends axially toward the transmission between the outer circumferential surface of the input shaft 3 and the inner circumferential surface of the impeller hub 28.

A fluid passage 16a through which operating fluid can pass in the radial direction is formed in the center boss 16. The fluid passage 16a provides communication between the space on the inside of the center boss 16 that communicates with the center hole 3a of the input shaft 3 and the space 8 on the outside of the center boss 16. A first thrust bearing 41 is disposed axially between the center boss 16 and the turbine hub 32 and bears the thrusting force that is produced due to the rotation of the turbine 22. A second thrust bearing 42 is disposed between the turbine hub 32 and an inner circumferential part of the stator 23 (more specifically, the one-way clutch 37). In the section where the second thrust bearing 42 is provided, a first port 18 is formed which allows fluid to communicate in the radial direction between both sides thereof. In short, the first port 18 links the fluid operating chamber 6 with the fluid passage between the input shaft 3 and the stationary shaft 39. There is also a third thrust bearing 43 disposed axially between the stator 23 (more specifically, the stator carrier 35) and the impeller 21 (more specifically, the impeller hub 28). In the section where the third thrust bearing 43 is provided, a second port 19 is formed which allows fluid to communicate in the radial direction between both sides thereof. In short, the second port 19 links the fluid operating chamber 6 with the fluid passage between the stationary shaft 39 and the impeller hub 28. Also, each fluid passage is connected to a hydraulic circuit (not shown) and fluid can be supplied and discharged to and from each of fluid passage 16a and ports 18 and 19 independently.

(2) Structure of Lockup Device

Figure 2:
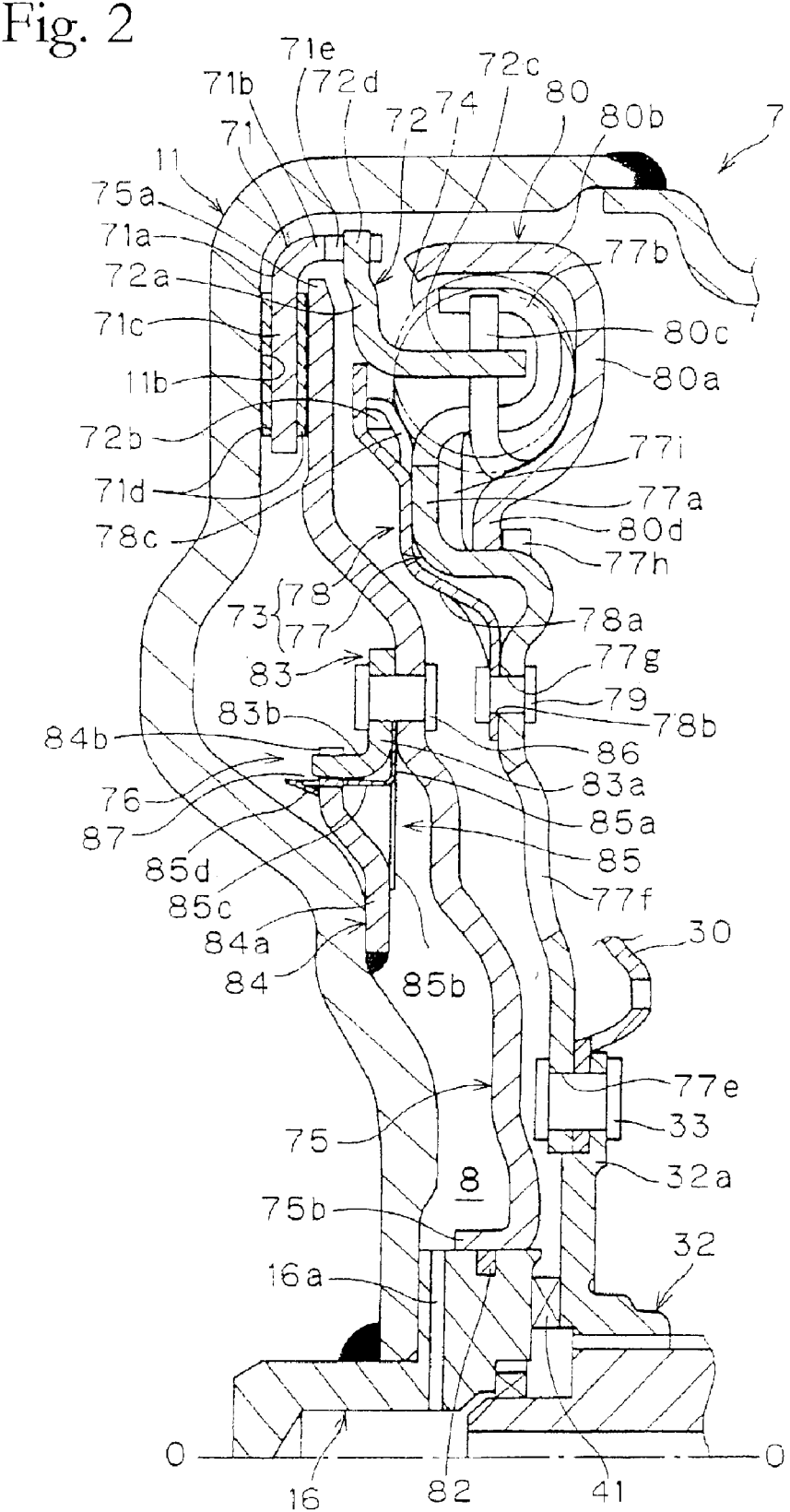
FIG. 2 is an enlarged partial view of FIG. 1 showing a cross-sectional view of the lockup device.
Figure 3:
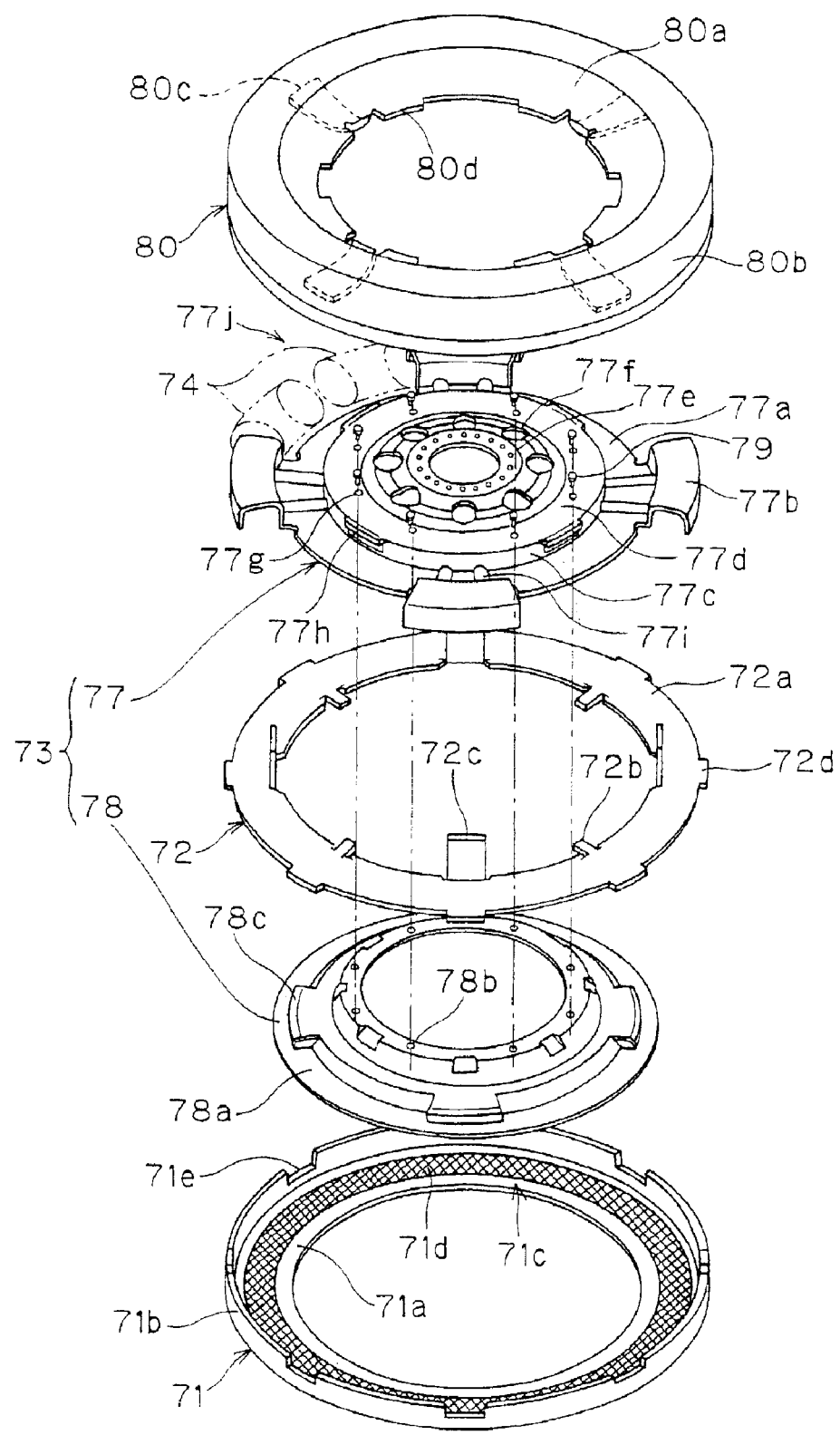
FIG. 3 is an exploded perspective view of components that are included in the lockup device such as, a clutch plate, a drive plate, a driven plate, and a spring holder.
Figure 4:
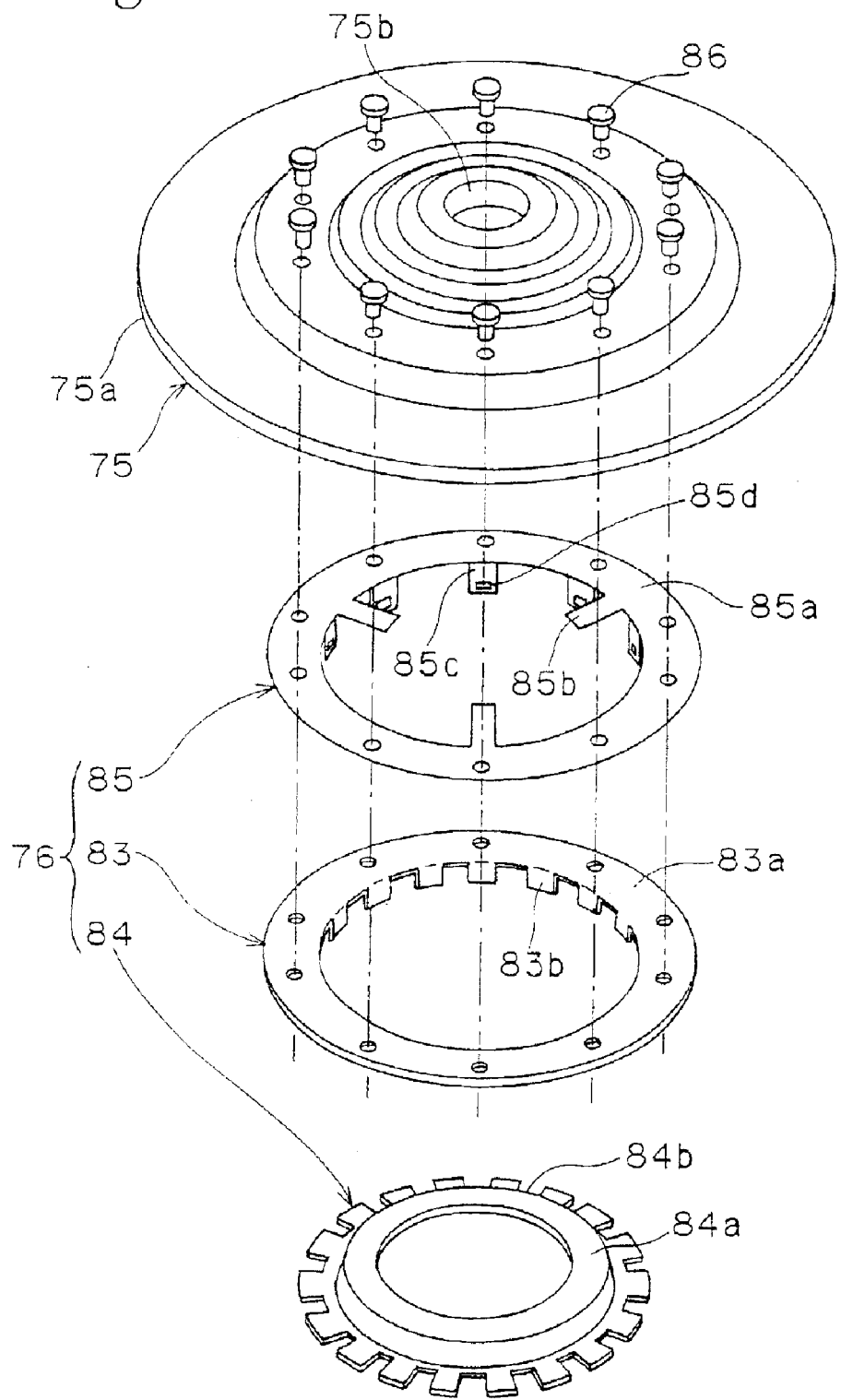
FIG. 4 is an exploded perspective view of the piston and the piston coupling mechanism of the torque converter.

The lockup device 7 is arranged in the space 8 between the turbine 22 and the front cover 11 and serves to couple mechanically the turbine and the front cover together when necessary. The lockup device 7 has both a clutch function and an elastic coupling or damper function. The lockup device 7 chiefly has a clutch plate 71, a drive plate 72, a driven plate 73, a plurality of torsion springs 74, a spring holder 80, a piston 75, and a piston coupling mechanism 76. FIG. 2 is a cross-sectional view of the portion of the torque converter 1 that contains the lockup device 7. FIG. 3 is an exploded perspective view of the clutch plate 71, drive plate 72, driven plate 73, plurality of torsion springs 74, and spring holder 80 of the lockup device 7. FIG. 4 is an exploded perspective view of the piston 75 and the piston coupling mechanism 76.

1 Driven Plate

As seen in FIGS. 2 and 3, the driven plate 73 has a first driven plate 77 and a second driven plate 78. The first driven plate 77 is an annular plate member whose inner circumferential part is fixed along with the turbine shell 30 to the flange part 32a of the turbine hub 32 with the plurality of rivets 33. The first driven plate 77 has an annular part 77a, a plurality of claw parts 77b, a cylindrical part 77c, and an annular part 77d. The plurality of claw parts 77b is formed on the outside edge of the annular part 77a. The cylindrical part 77c extends axially toward the transmission from the inside edge of the annular part 77a. The annular part 77d is formed on the end of cylindrical part 77c that is closer to the transmission. The annular part 77d has at least three sets of holes 77e, 77f, and 77g. The plurality of holes 77e is formed in an inner circumferential part thereof. The plurality of fluid holes 77f is formed to the radial outside of holes 77e. The plurality of holes 77g is formed to the radial outside of the fluid holes 77f. The holes 77e are provided for rivets 33 to pass therethrough. The fluid holes 77f serve to secure the flow of fluid in both axial directions through the first driven plate 77. The holes 77g are used for fixing the second driven plate 78 with a plurality of rivets 79.

The cylindrical part 77c has a plurality of cut-and-raised parts 77h formed near the edge of the transmission side thereof so as to point radially outward. In this embodiment, there are preferably four cut-and-raised parts 77h arranged to be equally spaced in the rotational direction. The annular part 77a has a plurality of protrusions 77i that protrude toward the transmission side of the annular part 77a in the axial direction and extend in a radial manner. The protrusions 77i are formed in pairs in positions corresponding to the circumferential spaces between the cut-and-raised parts 77h.

Similar to the protrusions 77i, the claw parts 77b are also formed in positions corresponding to the circumferential spaces between the cut-and-raised parts 77h. Thus, in this embodiment, there are four claw parts 77b arranged with equal spacing in the rotational direction. The claw parts 77b have a C-shaped cross section that protrudes toward the transmission in the axial direction. The circumferential spaces between the claw parts 77b constitute spring housing sections 77j, of which—similar to the claw parts 77b—there are preferably four in this embodiment. There are preferably two torsion springs 74 arranged inside each spring housing section 77j. Thus, there are preferably a total of four pairs of torsion springs 74, i.e. eight springs 74, arranged in the rotational direction.

The second driven plate 78 is an annular plate member arranged on the side of the first driven plate 77 that faces the engine in the axial direction. An inner circumferential part thereof is fixed to the first driven plate 77 with a plurality of rivets 79. The second driven plate 78 has an annular part 78a, a plurality of holes 78b formed in an inner circumferential part of the annular part 78a, and a plurality of cut-and-raised parts 78c formed on an outer circumferential portion. The holes 78b are formed in positions corresponding to the holes 77g of the first driven plate 77. The rivets 79 are arranged to pass through the holes 78b and 77g. The cut-and-raised parts 78c are formed so as to bulge out toward the transmission from positions corresponding to the claw parts 77b of the first driven plate 77. In this embodiment, there are preferably four of these cut-and-raised parts 78c.

2 Drive Plate

The drive plate 72 is a member that can rotate relative to the driven plate 73 and is sandwiched axially between the first driven plate 77 and the second driven plate 78. The drive plate 72 is an annular plate member having an annular part 72a, a plurality of protrusions 72b, a plurality of claw parts 72c, and a plurality of protrusions 72d. The plurality of protrusions 72b is formed on the inside edge of the annular part 72a. The plurality of protrusions 72b extends radially inward from the inside edge of the annular part 72a. The plurality of claw parts 72c is formed in positions corresponding to the circumferential spaces between the protrusions 72b. The plurality of claw parts 72c extends axially toward the transmission from the annular part 72a. The plurality of protrusions 72d is formed on the outside edge of the annular part 72a. The plurality of protrusions 72d extends radially outward from the outside edge of the annular part 72a.

The claw parts 72c extend toward the transmission in the axial direction and are formed in positions corresponding to the claw parts 77b of the first driven plate 77. There are preferably four claw parts 72c in this embodiment and they are arranged to extend in the C-shaped portions of the claw parts 77b of the first driven plate 77. The circumferential width of the claw parts 72c is narrower than the circumferential width of the cut-and-raised parts 78c of the second driven plate 78. The inner circumferential edge parts of the claw parts 72c are formed so as not to interfere with the outer circumferential face of the cut-and-raised parts 78c.

The protrusions 72b are formed circumferentially between the claw parts 72c and project radially inward. There are preferably four protrusions 72b in this embodiment and they extend further inward in the radial direction than do the rotationally facing edge sections of the cut-and-raised parts 78c of the second driven plate 78. Thus, when the drive plate 72 rotates relative to the driven plate 73, the protrusions 72b touch against the rotationally-facing edge sections of the cut-and-raised parts 78c such that the relative rotation between the drive plate 72 and the driven plate 73 is limited to a prescribed angular range. The radially inside edge of the drive plate 72 (i.e., the inside edge portion located circumferentially between the protrusions 72b and the claw parts 72c) fits around the outside edge of the cut-and-raised parts 78c of the second driven plate 78. In short, the drive plate 72 is positioned in the radial direction by the driven plate 73 (more specifically, the second driven plate 78). The engine side surface of the drive plate 72 touches against the transmission side surface of the outer circumferential part of the second driven plate 78. As a result, the drive plate 72 is also positioned in the axial direction by the driven plate 73. The protrusions 72d are formed so as to project radially outward from positions corresponding to the claw parts 72c and the protrusions 72b.

3 Spring Holder

The spring holder 80 is a member that can rotate relative to the drive plate 72 and the driven plate 73 and is disposed on the side of the first driven plate 77 that faces the transmission in the axial direction. The spring holder 80 is an annular plate member having an annular part 80a, a cylindrical part 80b, a plurality of claw parts 80c, and a plurality of protrusions 80d. The cylindrical part 80b is formed on the outside edge of the annular part 80a and extends in the axial direction toward the engine. The plurality of claw parts 80c is formed on the inside edge of the annular part 80a. The plurality of protrusions 80d is arranged circumferentially on both sides of each claw part 80c. The protrusions 80d extend radially inward from the annular part 80a. Further, the end of cylindrical part 80b that is closer to the engine has a narrowed form.

The claw parts 80c are formed by bending back the inside edge of the annular part 80a toward the outside. In other words, the claw parts 80c are formed by bending in the direction of the engine protrusions that extend radially inward from the annular part 80a such that the ends of the claw parts 80c opposite the annular part 80a extend toward the cylindrical part 80b. The claw parts 80c are arranged in positions corresponding to the circumferential center portions of the spring housing sections 77j of the first driven plate 77. The circumferential width of the inside portion of the claw parts 80c is smaller than circumferential width of the cut-and-raised parts 77h of the first driven plate 77.

The protrusions 80d are arranged circumferentially on both sides of each claw part 80c and protrude radially inward. The width of the portions circumferentially between the protrusions 80d (i.e., the width of the portions circumferentially between the protrusions 80d where the claw parts 80c are not formed) is larger than the circumferential width of the cut-and-raised parts 77h of the first driven plate 77. The plurality of protrusions 80d is arranged so as to be sandwiched axially between the cut-and-raised parts 77h and the protrusions 77i of the first driven plate 77. More specifically, the surface of each protrusion 80d that faces the transmission in the axial direction is supported by a cut-and-raised part 77h of the first driven plate 77 and the surface of the annular part 80a that faces the engine is supported by the protrusions 77i of the first driven plate 77. As a result, the spring holder 80 is positioned in the axial direction by the driven plate 73 (more particularly, the first driven plate 77). Also, the inside edges of the protrusions 80d fit around the outside surface of the cylindrical part 77c of the first driven plate 77. In short, the driven plate 73 (more particularly, the first driven plate 77) supports the radially inside portion of the spring holder 80 such that the spring holder 80 can rotate relative thereto and also positions the spring holder 80 in both the axial and radial directions.

4 Torsion Springs

The torsion springs 74 have a plurality, preferably eight in this embodiment, of coil springs arranged in pairs in the spring housing sections 77j of the first driven plate 77. The rotationally facing ends of each pair of torsion springs 74 are supported either directly or through a spring seat on the rotationally facing edge sections of the claw parts 77b, which serve to transmit torque. The claw parts 80c of the spring holder 80 are arranged so as to be sandwiched circumferentially between the two torsion springs 74 disposed in each spring housing section 77*j*. The claw parts 80*c* serve to support either directly or through a spring seat the mutually facing ends of the two torsion springs 74, i.e., the ends between which the claw parts 80*c* are sandwiched. Moreover, the radially inside portion, the radially outside portion, and the transmission facing portion of the torsion springs 74 are supported by the annular part 80*a* and the cylindrical part 80*b* of the spring holder 80.

Thus, when the drive plate 72 and the driven plate 73 rotate relative to each other, the pairs of torsion springs 74 are compressed between the rotationally facing edge sections of the claw parts 72*c* of the drive plate 72 and the rotationally facing edge sections of the claw parts 77*b* of the driven plate 73. When this occurs, the claw parts 80*c* of the spring holder 80 act to press against the adjacent rotationally facing ends of the torsion springs 74 due to the compression of the torsion springs 74. In short, the pairs of the torsion springs 74 housed in the spring housing sections 77*j* are made to act in series in the rotational direction.

5 Clutch Plate

The clutch plate 71 functions chiefly as a friction coupling part that couples with and releases from the front cover 11. It is installed axially between the driven plate 73 and the front cover 11. The clutch plate 71 is an annular plate member having an annular part 71*a* and a cylindrical part 71*b* that extends from the outside edge of the annular part 71*a* toward the turbine in the axial direction. The inner circumferential portion of the annular part 71*a* constitutes the friction coupling part 71*c* and is in close proximity to the friction surface 11*b* of the front cover 11. The friction facings 71*d* are attached to both surfaces of the friction coupling part 71*c*. The cylindrical part 71*b* has a plurality, preferably eight in this embodiment, of recessions 71*e* formed in the transmission facing edge thereof so as to correspond to the protrusions 72*d* of the drive plate 72. The protrusions 72*d* mate with the recessions 71*e* such that relative rotation is not possible. In short, the clutch plate 71 mates with the drive plate 72 such that it cannot rotate relative to the drive plate 72.

6 Piston

The piston 75 is a circular disc-shaped member with a center hole formed therein and serves-to engage and disengage the clutch. The piston 75 is positioned on the outside of the center boss 16. The outer circumferential portion of the piston 75 constitutes a pressing part 75*a*. The pressing part 75*a* is a flat, annular section disposed on the transmission side of the friction coupling part 71*c* of the clutch plate 71. Consequently, when the piston 75 moves toward the engine, the pressing part 75*a* presses the friction coupling part 71*c* against the friction surface 11*b* of the front cover 1. Meanwhile, the inner circumferential portion of the piston 75 is provided with a cylindrical part 75*b* that extends toward the engine in the axial direction. The internal surface of the cylindrical part 75*b* fits around the external surface of the center boss 16 such that it can move in the axial direction. A seal ring 82 is provided between the external surface of the center boss 16 and the cylindrical part 75*b* so that fluid does not flow between the engine side of the piston 75 and the transmission side of the piston 75 within the space 8.

Next, the relative positioning of the clutch plate 71, the drive plate 72, the torsion springs 74, and the piston 75 is explained. The clutch plate 71 has a friction coupling part 71*c* and is positioned in the radial direction such that it is aligned with the friction surface 11*b* of the front cover 11.

The pressing part 75*a* of the piston 75 extends to the radial position of the friction coupling part 71*c* so that it can press against the friction coupling part 71*c*. The mounting radius of the torsion springs 74 is shorter than a radius extending to outside edges of the piston 75 or the friction coupling part 71*c*. The claw parts 72*c* of the drive plate 72 are arranged at a radial position that is roughly the same as the mounting radius of the torsion springs 74. The protrusions 72*d* of the drive plate 72 are arranged at a radial position that is farther from the rotational axis than the mounting radius of the torsion springs 74 (in this embodiment, farther from the rotational axis than outside edges of the piston 75 and the friction coupling part 71*c*) and mate with the recessions 71*e* of the clutch plate 71.

7 Piston Coupling Mechanism

Referring now to FIGS. 2 and 4, the piston coupling mechanism 76 functions to couple the piston 75 to the front cover II in such a manner that the piston 75 rotates integrally with the front cover II but can move relative to the front cover 11 in the axial direction. With respect to the radial direction, the piston coupling mechanism 76 is provided at an intermediate position between the pressing part 75*a* and the cylindrical part 75*b* of the piston 75. The piston coupling mechanism 76 has a piston lug plate 83 (second member), a cover lug plate 84 (first member), and a return plate 85 (third member).

The piston lug plate 83 is an annular plate that is fixed to the engine side of the piston 75 with a plurality of rivets 86. The piston lug plate 83 has an annular part 83*a* and a plurality of claw parts 83*b* that project toward the engine in the axial direction from the inside edge of the annular part 83*a*. The claw parts 83*b* are arranged circumferentially and there are preferably 18 of them in this embodiment.

The cover lug plate 84 is an annular plate that is fixed to the turbine side of the front cover 11 by welding. The cover lug plate 84 has an annular part 84*a* and a plurality of recessions 84*b* (mating parts) formed so as to recess inward from the outside edge of the annular part 84*a*. The recessions 84*b* are arranged in positions corresponding to the claw parts 83*b* of the piston lug plate 83 and the claw parts 83*b* mate therewith such that the two lug plates 83 and 84 cannot rotate relative to each other but can move in the axial direction relative to each other. Thus, the piston 75 can move relative to the front cover 11 in the axial direction but not in the rotational direction. When the recessions 84*b* and the claw parts 83*b* are in a mated state, a plurality, preferably eighteen in this embodiment, of slit parts 87, i.e., slit-shaped gaps, are formed radially between the claw parts 83*b* and the recessions 84*b*.

The return plate 85 is an annular plate that is fixed along with the piston lug plate 83 to the engine-side of the piston 75 with the rivets 86. The return plate 85 has an annular part 85*a* (fixed part), a plurality of protrusions 85*b*, and a plurality of claw parts 85*c*. The plurality of protrusions 85*b* (elastic parts) projects radially inward from the inside edge of the annular part 85*a*. The plurality of claw parts 85*c* (hook parts) is formed circumferentially between the protrusions 85*b*. The plurality of claw parts 85*c* projects axially toward the engine from the annular part 85*a*. There are three protrusions 85*b* in this embodiment and the tips of these protrusions 85*b* touch against the transmission facing surface of the annular part 84*a* of the cover lug plate 84. There are preferably nine claw parts 85*c* in this embodiment and these claw parts 85*c* are shaped such that they extend toward the engine in the axial direction from the inside edge of the annular part 85*a*. The tips of the claw parts 85*c* (i.e., the portion closer to the engine) are provided with cut-andraised parts 85d that catch in the slit parts 87 and serve to limit the distance to which the piston 75 can move toward the transmission in the axial direction.

Thus, when the piston 75 moves toward the engine in the axial direction, the return plate 85 can apply a force that pushes the piston 75 toward the transmission in the axial direction because the protrusions 85b deform elastically. Moreover, when the piston 75 moves toward the transmission in the axial direction, the return plate 85 can limit the movement of the piston 75 toward the transmission because the cut-and-raised parts 85d of the claw parts 85c touch against the inner circumferential rim of the recessions 84b of the cover lug plate 84 (more particularly, against the slit parts 87).

(3) Operation of Torque Converter

The operation of the torque converter is described with reference to FIGS. 1 and 2.

Immediately after the engine is started, operating fluid is supplied to the inside of the torque converter main body 5 through the fluid passage 16a and the second port 19. Fluid is discharged from the first port 18. The fluid supplied through the fluid passage 16a flows radially outward between the front cover 11 and the piston 75 within the space 8. The fluid passes through the axial spaces on both sides of the clutch plate 71 and finally flows into the fluid operating chamber 6.

During this process, the piston 75 moves toward the turbine 22 because the hydraulic pressure is higher in the space 8 than in the fluid operating chamber 6 and because of the force applied by the protrusions 85b of the return plate 85. The piston 75 stops when the cut-and-raised parts 85d of the return plate 85 of the piston coupling mechanism 76 abut against the rim part of the slit parts 87. When the lockup device is disengaged in this manner, torque is transmitted between the front cover 11 and the turbine 22 by the fluid driven between the impeller 21 and the turbine 22.

Under these conditions, there are times when changes in the hydraulic pressure within the torque converter 1 cause a force to act on the piston 75 toward the front cover 11. However, since the return plate 85 pushes the piston 75 in the direction of separation from the front cover 11, i.e. toward the transmission, it is difficult for the piston 75 to move toward the engine.

When the gear ratio of the torque converter 1 increases and the rotational speed of the input shaft 3 reaches a prescribed speed, fluid from the space 8 is discharged through the fluid passage 16a. As a result, the hydraulic pressure of the fluid operating chamber 6 becomes higher than hydraulic pressure of the space 8 and the piston 75 moves toward the engine. As a result, the pressing part 75a of the piston 75 presses the friction coupling part 71c of the clutch plate 71 against the friction surface 11b of the front cover 11. Since the piston 75 then rotates integrally with the front cover II due to the piston coupling mechanism 76, torque is transferred from the front cover 11 to the clutch plate 71. Meanwhile, since the piston lug plate 83 of the piston coupling mechanism 76 is close to the cover lug plate 84 because the piston 75 has moved toward the engine, the protrusions 85b of the return plate 85 touch against the transmission facing surface of the annular part 84a of the cover lug plate 84 and deform elastically. The torque of the front cover 11 is transmitted from the drive plate 72, which is mated with the clutch plate 71 such that it cannot rotate relative to the clutch plate 71, to the driven plate 73 through the torsion springs 74. In short, torque is transmitted from the drive plate 72 to the driven plate 73 through the torsion springs 74. In other words, the front cover 11 is mechanically coupled with the turbine 22 and the torque of the front cover 11 is imparted directly to the input shaft 3 through the turbine 22. When this occurs, the relative rotation between the drive plate 72 and the driven plate 73 causes the torsion springs 74 to be compressed between the rotationally facing edge surfaces of the claw parts 72c of the drive plate 72 and the rotationally facing edge surfaces of the claw parts 77b of the first driven plate 77 while the claw parts 80c of the spring holder 80 are sandwiched between spring pairs. In other words, the spring holder 80 rotates relative to the drive plate 72 and the driven plate 73 and functions to cause the pairs of torsion springs 74 to act in series in the rotational direction.

The side of the torsion springs 74 that faces radially outward and the side of the same that faces toward the transmission are supported by the spring holder 80 and cannot easily slide with respect to the drive plate 72 and the driven plate 73.

The rotation of the drive plate 72 with respect to the driven plate 73 is limited to a prescribed angular range because the protrusions 72b, which are provided on the inner circumference of the drive plate, touch against the rotationally facing edge sections of the cut-and-raised parts 78c, which are provided on the second driven plate 78. Since both surfaces of the friction coupling part 71c of the clutch plate 71 are provided with the friction facings 71d, the torque transmission capacity is larger than for lockup devices having a single friction surface.

4 Assembly of Piston Coupling Mechanism

The assembly of the piston coupling part 76 is described with reference to FIG. 5.

Figure 5:
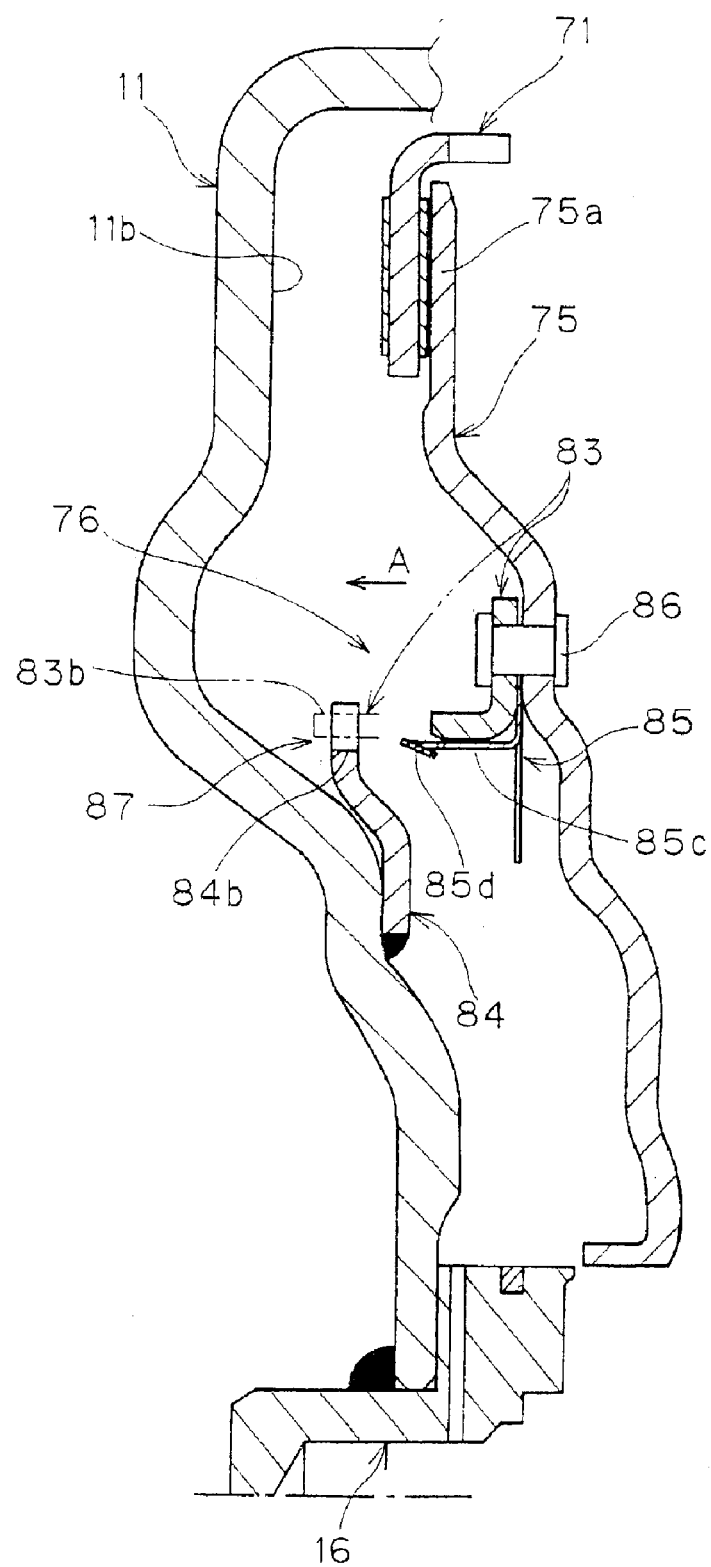
FIG. 5 illustrates the assembly of the piston coupling mechanism.

As shown in FIG. 5, the cover lug plate 84 is fixed to the front cover 11 at a prescribed position by welding. Meanwhile, the piston lug plate 83 and the return plate 85 are fixed to the piston 75 at a prescribed position with the rivets 86. Next, the piston 75 is fitted onto the external surface of the center boss 16 in the direction of arrow A such that the clutch plate 71 is axially sandwiched between the pressing part 75a of the piston 75 and the friction surface 11b of the front cover 11. When this is done, the claw parts 83b of the piston lug plate 83 mate with the recessions 84b of the cover lug plate 84 and the cut-and-raised parts 85d of the claw parts 85c of the return plate 85 mate with the inner circumferential rim of the recessions 84b while deforming elastically (more specifically, the claw parts 85c of the return plate 85 pass through the slit parts 87—which are formed by the mating of the claw parts 83b and the recessions 84b— and the cut-and-raised parts 85d catch in the slit parts 87). Thus, the piston 75 is mounted to the front cover 11 along with the piston coupling mechanism 76.

5 Features of Piston Coupling Mechanism

This embodiment of the piston coupling mechanism 76 has the following features.

1 Fewer Man-hours Required for Assembly of Piston Coupling Mechanism

This embodiment of the piston coupling mechanism 76 can be assembled by utilizing the fact that the piston lug plate 83 fixed to the piston 75 mates with the cover lug plate 84 fixed to the front cover 11 such that the piston lug plate 83 cannot rotate relative to the cover lug plate 84 but can move in the axial direction relative to the cover lug plate 84 and the fact that the claw parts 85c of the return plate 85 mate with the cover lug plate 84 while elastically deforming the cut-and-raised parts 85d of the claw parts 85c. Thus, assembly man-hours can be reduced in comparison with the assembly man-hours of conventional piston coupling mechanisms. As a result, the amount of work required for assembly of the entire the lockup device 7 can be reduced.

Furthermore, this embodiment of the piston coupling mechanism 76 includes a piston lug plate 83, a cover lug plate 84, and a return plate 85. The lug plates 83 and 84 function to transmit torque between the front cover 11 and the piston 75. The return plate 85 functions to apply a force opposing the axial movement of the piston 75 and to limit the distance over which the piston 75 moves in the axial direction. Consequently, it is not necessary to provide a relatively strong, heavy, and/or rigid return plate 85. Thus, the weight of the piston coupling mechanism 76 can be reduced and the structure of the piston coupling mechanism 76 can be simplified.

Moreover, the shape of the cover lug plate 84 can be simplified because both the claw parts 83b of the piston lug plate 83 and the claw parts 85c of the return plate 85 mate with the recessions 84b of the cover lug plate 84.

2 Fewer Parts Making up Piston Coupling Mechanism

With this embodiment of the piston coupling mechanism 76, the piston coupling mechanism 76 has three members: a piston lug plate 83, a cover lug plate 84, and a return plate 85. Thus, the number of parts making up the piston coupling mechanism 76 has been reduced relative to conventional piston coupling mechanisms. The number of parts making up the piston coupling mechanism 76 has also been reduced because the return plate 85 is provided with both the protrusions 85b and the claw parts 85c. As a result, the number of parts making up the entire lockup device 7 can also be reduced.

3 Simple Adjustment of Pushing Force Against the Piston and Movement Distance of the Piston This embodiment of the piston coupling mechanism 76 is arranged such that the protrusions 85b of the return plate 85 push the piston 75 toward the transmission in the axial direction. The pushing force can be adjusted easily by changing the width and length of the protrusions 85b. Also, the distance range through which the piston 75 can move in the axial direction can be adjusted easily by changing the axial length of the claw parts 85c and the axial position of the cut-and-raised parts 85d.

Second Embodiment

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

A second preferred embodiment of the present invention is described below based on the drawings. This embodiment is the same as or similar to the first described embodiment except for some differences in the structure of the piston coupling mechanism. The differences with respect to the first preferred embodiment are described with reference to FIGS. 6 and 7.

Figure 6:
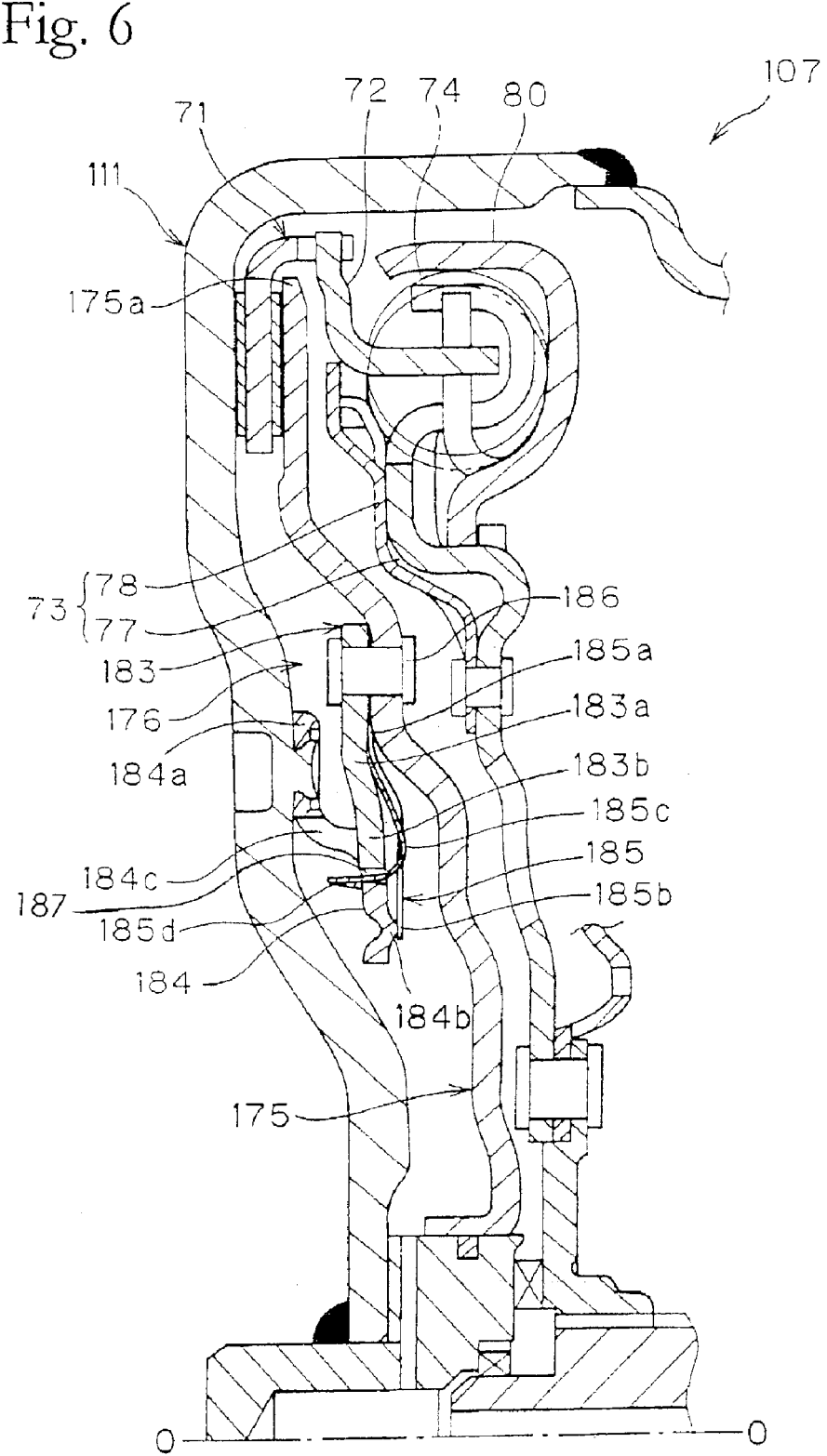
FIG. 6 is a view equivalent to that of FIG. 2 showing a lockup device that utilizes a piston coupling mechanism in accordance with a second preferred embodiment of the present invention.
Figure 7:
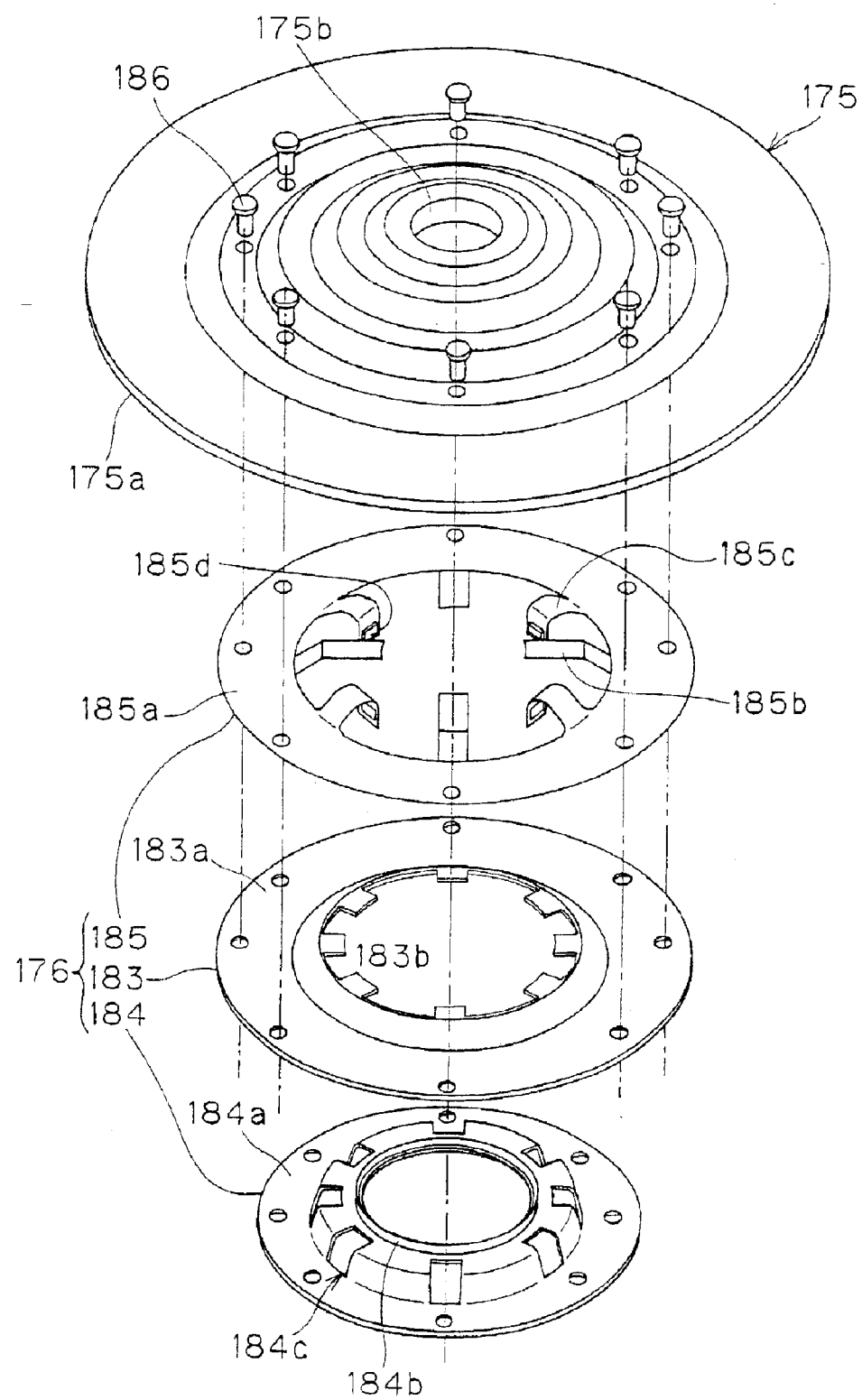
FIG. 7 is an exploded perspective view of the piston and the piston coupling mechanism of FIG. 6.

Similar to the first preferred embodiment, a lockup device 107 chiefly has a clutch plate 71, a drive plate 72, a driven plate 73, a plurality of torsion springs 74, a spring holder 80, a piston 175, and a piston coupling mechanism 176. FIG. 6 illustrates a partial cross-sectional view of the lockup device 107 for this embodiment and FIG. 7 is an exploded perspective view of the piston 175 and the piston coupling mechanism 176 of the lockup device 107. The structures of the clutch plate 71, drive plate 72, driven plate 73, plurality of torsion springs 74, and spring holder 80 are the same as or similar to those of the first embodiment and their explanation is omitted here.

The piston coupling mechanism 176 functions to couple the piston 175 to the front cover 111 in such a manner that the piston rotates integrally with the front cover 111 but can move relative to the front cover 111 in the axial direction. With respect to the radial direction, the piston coupling mechanism 176 is provided at an intermediate position between the pressing part 175a and the cylindrical part 175b of the piston 175. The piston coupling mechanism 176 includes a piston lug plate 183 (second member), a cover lug plate 184 (first member), and a return plate 185 (third member).

The piston lug plate 183 is an annular plate that is fixed to the engine side of the piston 175 with the rivets 186 and has an annular part 183a and a plurality of protrusions 183b that projects radially inward from the inside edge of the annular part 183a. There are preferably eight protrusions 183b in this embodiment and the protrusions 183b are arranged in a circumferential manner.

The cover lug plate 184 is an annular plate that is fixed to the turbine side of the front cover 11 by half punch staking. The cover lug plate 184 has an annular part 184a, an annular protrusion 184b, and a plurality of window parts 184c. The annular protrusion 184b is formed so as to protrude toward the transmission from the inside edge of the annular part 184a. The plurality of window parts 184c (mating parts) are circumferentially arranged cut out sections. The portion of the annular part 184a where the window parts 184c are formed has a shape that is bent relative to the axial direction. Consequently, the window parts 184c (of which there are preferably eight in this embodiment) are shaped like angled holes having a portion that opens in an axial direction and a portion that opens in a radial direction.

The protrusions 183b of the piston lug plate 183 mate with the window parts 184c such that the piston lug plate 185 cannot rotate relative to the cover lug plate 184 but can move in the axial direction. Consequently, the piston 175 can move in the axial direction with respect to the front cover 111 but cannot rotate relative to the front cover 111. When the window parts 184c and the protrusions 183b are in the mated state, a plurality (preferably eight in this embodiment) of slit parts 187, i.e., slit-shaped gaps, is formed radially between the protrusions 183b and the window parts 184b.

The return plate 185 is an annular plate that is fixed along with the piston lug plate 183 to the engine-side of the piston 175 with a plurality of rivets 186. The return plate 185 has an annular part 185a (fixed part), a plurality of protrusions 185b (elastic parts), and a plurality of claw parts 185c. The protrusions 185b project radially inward from the inside perimeter of the annular part 185a. The plurality of claw parts 185c (hook parts) is formed circumferentially between the protrusions 185b. There are preferably four protrusions 185b in this embodiment and the tips of these protrusions 185b touch against the transmission facing surface of the annular protrusion 184b of the cover lug plate 184. There are preferably four claw parts 185c in this embodiment and each of these claw parts 185c has a portion that extends radially inward from the inside edge of the annular part 185a and a portion that extends axially toward the engine. The latter portion is located further inward than former portion. The tips of the claw parts 185c (i.e., the portion closer to the engine) are provided with cut-and-raised parts 185d that catch in the slits 187 and serve to limit the distance to which the piston 175 can move toward the transmission in the axial direction.

Thus, when the piston 175 moves toward the engine in the axial direction, the return plate 185 can apply a force that pushes against the piston 175 toward the transmission in the axial direction because the protrusions 185b deform elastically. Moreover, when the piston 175 moves toward the transmission in the axial direction, the return plate 185 can limit the movement of the piston 175 toward the transmission because the cut-and-raised parts 185d touch against the inner circumferential rim of the window parts 184c of the cover lug plate 184 (more particularly, against the slit parts 187).

This embodiment achieves the same or similar effects as those described in the first embodiment.

Other Embodiments

Embodiments of the present invention have been described based on the drawings, but the specific features of the present invention are not limited to those of the previously described embodiments. Modifications are possible so long as the gist of the invention is not exceeded.

For example, instead of applying the piston coupling mechanism of the present invention to a torque converter, it can be applied to a fluid coupling or other fluid-type torque transmission device.

Although the return plate is fixed to the piston in the previously described embodiments, it is also acceptable for the return plate to be fixed to the front cover.

Effects of the Invention

The piston coupling mechanism of the present invention can be assembled by utilizing the fact that the first member or the second member mates with the other in such a manner that it can move in the axial direction and the fact that the hook part of the third member mates with the second or first member (i.e., the "other" member) while deforming elastically. As a result, amount of work required for assembly can be reduced in comparison with conventional piston coupling mechanisms.

As used herein, the following directional terms "forward, rearward, above, downward, vertical, horizontal, below, and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-73006. The entire disclosure of Japanese Patent Application No. 2002-73006 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A piston coupling mechanism for a lockup device in a fluid-type torque transmission device comprising:
   a piston being configured to press a friction coupling part of a clutch mechanism against a front cover of the fluid-type torque transmission device, said piston being configured to couple non-rotatably and axially movably with said front cover;
   a first member being fixed to said front cover;
   a second member being fixed to said piston, said second member being configured to mate non-rotatably and axially movably with said first member; and
   a third member having,
      a fixed part being fixed to said first member or said second member,
      a hook part being configured to mate with said first member or said second member such that said hook part mates with a member different from a member to which said fixed part is fixed, said hook part being configured to mate from an axial direction while deforming elastically and to limit the distance said piston moves away from said front cover in said axial direction, and
      an elastic part being configured to deform elastically in said axial direction when said piston is pressed against said friction coupling part of said clutch mechanism against said front cover of the fluid-type torque transmission device.

2. The piston coupling mechanism according to claim 1, wherein
   said third member is an annular member on which a plurality of said hook parts and a plurality of said elastic parts are formed.

3. The piston coupling mechanism according to claim 2, wherein
   a plurality of mating parts that mate with said plurality of said hook parts is formed on said first member or second member different from said member to which said fixed part is fixed.

4. The piston coupling mechanism according to claim 3, wherein
   a portion of said member to which said fixed part is fixed non-rotatably and axially movably mates with said plurality of mating parts.

5. The piston coupling mechanism according to claim 4, wherein
   said plurality of hook parts extends axially from said fixed part, and
   said plurality of elastic parts extends radially from said fixed part.

6. The piston coupling mechanism according to claim 3, wherein
   said plurality of hook parts extends axially from said fixed part, and
   said plurality of elastic parts extends radially from said fixed part.

7. The piston coupling mechanism according to claim 2, wherein
   said plurality of hook parts extends axially from said fixed part, and
   said plurality of elastic parts extends radially from said fixed part.

8. The piston coupling mechanism according to claim 1, wherein a plurality of mating parts that mate with a plurality of said hook parts is formed on said first member or second member different from said member to which said fixed part is fixed.

9. The piston coupling mechanism according to claim 8, wherein a portion of said member to which said fixed part is fixed non-rotatably and axially movably mates with said plurality of mating parts.

10. The piston coupling mechanism according to claim 9, wherein said plurality of hook parts extends axially from said fixed part, and said plurality of elastic parts extends radially from said fixed part.

11. The piston coupling mechanism according to claim 8, wherein said plurality of hook parts extends axially from said fixed part, and said plurality of elastic parts extends radially from said fixed part.

12. The piston coupling mechanism according to claim 1, wherein a plurality of said hook parts extends axially from said fixed part, and a plurality of said elastic parts extends radially from said fixed part.

13. A fluid-type torque transmission device comprising:

a front cover having a friction surface;

an impeller being fixed to said front cover to form a fluid chamber;

a turbine being arranged axially opposite said impeller inside said fluid chamber; and a lockup device comprising, a clutch mechanism having a friction coupling part being configured to be pressed against said friction surface of said front cover, an elastic coupling mechanism being configured to couple elastically said clutch mechanism and said turbine in a rotational direction, a piston being arranged between said front cover and said turbine, said piston being configured to press said friction coupling part against said friction surface, and a piston coupling mechanism comprising, a first member being fixed to said front cover, a second member being fixed to said piston, said second member being configured to mate non-rotatably and axially movably with said first member, and a third member having, a fixed part being fixed to said first member or said second member, a hook part being configured to mate with said first member or said second member such that said hook part mates with a member different from a member to which said fixed part is fixed, said hook part being configured to mate from an axial direction while deforming elastically and to limit the distance said piston moves away from said front cover in said axial direction, and an elastic part being configured to deform elastically in said axial direction when said piston is pressed against said friction coupling part of said clutch mechanism against said front cover.

14. The fluid-type torque transmission device according to claim 13, wherein said third member is an annular member on which a plurality of said hook parts and a plurality of said elastic parts are formed.

15. The fluid-type torque transmission device according to claim 14, wherein a plurality of mating parts that mate with said plurality of said hook parts is formed on said first member or second member different from said member to which said fixed part is fixed.

16. The fluid-type torque transmission device according to claim 15, wherein a portion of said member to which said fixed part is fixed non-rotatably and axially movably mates with said plurality of mating parts.

17. The fluid-type torque transmission device according to claim 16, wherein said plurality of hook parts extends axially from said fixed part, and said plurality of elastic parts extends radially from said fixed part.

18. The fluid-type torque transmission device according to claim 15, wherein said plurality of hook parts extends axially from said fixed part, and said plurality of elastic parts extends radially from said fixed part.

19. The fluid-type torque transmission device according to claim 14, wherein said plurality of hook parts extends axially from said fixed part, and said plurality of elastic parts extends radially from said fixed part.

20. The fluid-type torque transmission device according to claim 13, wherein a plurality of said mating parts that mate with a plurality of said hook parts is formed on said first member or second member different from said member to which said fixed part is fixed.

21. The fluid-type torque transmission device according to claim 20, wherein a portion of said member to which said fixed part is fixed non-rotatably and axially movably mates with said plurality of mating parts.

22. The fluid-type torque transmission device according to claim 21, wherein said plurality of hook parts extends axially from said fixed part, and said plurality of elastic parts extends radially from said fixed part.

23. The fluid-type torque transmission device according to claim 20, wherein said plurality of hook parts extends axially from said fixed part, and said plurality of elastic parts extends radially from said fixed part.

24. The fluid-type torque transmission device according to claim 13, wherein a plurality of said hook parts extends axially from said fixed part, and a plurality of said elastic parts extends radially from said fixed part.

25. A fluid-type torque transmission device comprising:
a front cover having a friction surface;
an impeller being fixed to said front cover to form a fluid chamber;
a turbine being arranged axially opposite said impeller inside said fluid chamber; and
a lockup device comprising,
- a clutch mechanism having a friction coupling part being configured to be pressed against said friction surface of said front cover,
- an elastic coupling mechanism being configured to couple elastically said clutch mechanism and said turbine in a rotational direction;
- a piston being arranged between said front cover and said turbine, said piston being configured to press said friction coupling part against said friction surface; and
- a piston coupling mechanism comprising,
  - a cover lug plate being fixed to said front cover,
  - a piston lug plate being fixed to said piston, said piston lug plate being configured to mate non-rotatably and axially movably with said cover lug plate, and
  - a return plate having,
    - an annular part being fixed to said cover lug plate or said piston lug plate,
    - a plurality of claw parts being configured to mate with said cover lug plate or said piston lug plate such that said claw parts mate with a lug plate different from a lug plate to which said annular part is fixed, said claw part being configured to mate from an axial direction while deforming elastically and to limit the distance said piston moves away from said front cover in said axial direction, and
    - a plurality of protrusions being configured to deform elastically in said axial direction when said piston is pressed against said friction coupling part of said clutch mechanism against said front cover.

* * * * *